Patented Apr. 25, 1939

2,155,731

UNITED STATES PATENT OFFICE 2,155,731

PAPER TREATMENT

Harold S. Mitchell, Chicago, Ill., assignor to Industrial Patents Corporation, Chicago, Ill., a corporation of Delaware No Drawing. Application September 13, 1935, Serial No. 40,460

1 Claim. (Cl. 91—68)

This invention relates to the treatment of paper prepared for use in wrapping fats and oils or products containing fats and oils.

One of the objects of the invention is to provide a method for treating paper stock used in packaging bakery products.

Another object of the invention is to provide a treated paper suitable for packaging bakery products.

Other objects of the invention will be apparent from the description and claim which follow.

It is customary to package crackers, cookies and similar bakery products, which must be held for a considerable length of time between packaging and consumption, in cardboard boxes. Such products contain shortening, some of which soaks into the cardboard. Due to the accelerating action of certain ingredients of the cardboard, the fats become rancid and produce an unsavory odor at the time the package is opened. The presence of the rancid fat in the cardboard may or may not adversely affect the product packed in the carton, but in any event the odor is offensive and in the case of delicately flavored product may cause deterioration of the product itself. It appears that the onset of rancidity of the fat soak in the cardboard is due in part to the increased surface exposure but is most noticeable in the case of cardboards which contain substances such as metals, sulphites, and other materials that tend to catalyze the development of rancidity. The presence of such catalyzers causes rancidity to develop almost immediately after the paper comes in contact with the baked products from which fat can be absorbed by the cardboard.

The present invention involves treatment of the cardboard with citric acid as an antioxidant.

In one test in which one gram of fat was added to each of three identical samples of cardboard, subsequently incubated at 140° Fahrenheit, the following results were noted:

| | Stability of fat by active oxygen method | Rancidity development when incubated at 140° F. |
|---|---|---|
| | Hours | |
| Hydrogenated vegetable shortening (stabilized) | 72 | Less than 1 day. |
| Oleo oil | 7 | Do. |
| Hydrogenated vegetable shortening | 4 | Do. |

Similar samples of boards were treated with 2.5 grams of citric acid dissolved in 97.5 grams of alcohol, giving a 2.5 per cent solution.

Samples of cardboard 209 millimeters long and 71 millimeters wide, weighing 6.4 grams, were immersed in the alcohol stabilizer solutions and allowed to soak up 5 grams, giving a concentration of 0.125 gram of the stabilizing agent in each of the boards containing the 2.5% solutions, or 2% of the stabilizing products, based on the total weight of the boards.

The alcohol was then evaporated from the boards by means of a drying oven and the boards impregnated with 2 grams of melted stabilized hydrogenated vegetable shortening identical to that used in the previous test. The boards containing both the stabilizing materials and the shortening were then placed into covered glass jars and incubated at 140° Fahrenheit.

The following tabulation gives the results of these keeping tests as determined organoleptically from day to day on the incubated samples:

| | Keeping time incubated at 140° F. |
|---|---|
| Plain board untreated, containing 2 gms. shortening | days 3 |
| Same (soaked in 2.5% solution citric acid) | days 72 |

Specially manufactured cardboards are prepared in commercial practice for cracker boxes in which paraffin or silicate coatings are used for moisture proofing. The addition of citric acid to these coatings produces a cardboard package which inhibits the development of rancidity.

The antioxidant may be added to the paper stock at any time during or after manufacture. If desired, the antioxidant may be added to the pulp or at one of the stages in which the pulp is being formed into a sheet.

In the claim which follows, the term "paper" is used in the broad sense as including cardboard, fiber board, and the like.

I claim:

The method of treating paper stock for use in packaging products containing fats and oils which consists in incorporating a citric acid solution in the paper stock.

HAROLD S. MITCHELL.